Figure 1:
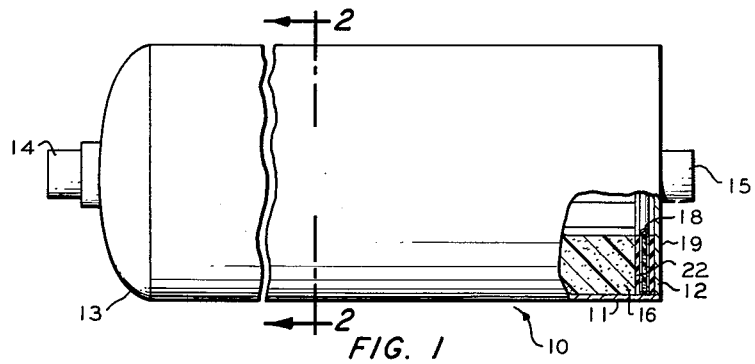

Dec. 4, 1962  D. M. GEORGE ETAL  3,066,481
PROPELLANT EXPANSION JOINT
Filed Nov. 3, 1958  2 Sheets-Sheet 1

INVENTORS
D.M. GEORGE
E.E. RUSH
E.C. HELD
BY Hudson and Young
ATTORNEYS

United States Patent Office 3,066,481
Patented Dec. 4, 1962

3,066,481
PROPELLANT EXPANSION JOINT
David M. George, Brigham City, Utah, Elton E. Rush, McGregor, Tex., and Edward C. Held, Jr., Bartlesville, Okla., assignors to Phillips Petroleum Company, a corporation of Delaware
Filed Nov. 3, 1958, Ser. No. 771,669
7 Claims. (Cl. 60—35.6)

This invention relates to expansion joints for relieving the stresses caused by the differential expansion of contraction of a solid propellant grain and/or a rocket motor case wherein such grain is positioned. In one aspect the invention relates to a method and means for accommodating the differential expansion and contraction in a relatively large rocket motor wherein the solid propellant charge is made up of a plurality of modules bonded to each other and to the rocket motor case.

In large rocket motors the solid propellant charge is sometimes made up of a plurality of individual grains bonded to each other and also bonded to the case. One type of large, case-bonded, perforated charge is made up of a plurality of substantially identical and symmetrical modules bonded together and to the motor case at their peripheral junctions so that the perforation is substantially star-shaped.

A cause of possible failure of large rocket motors results from motor case and propellant differentially expanding or contracting as the motor changes temperature. Another cause is the expansion or contraction of the motor case with changes in pressure. Effects of differential expansion or contraction would manifest itself by propellant cracking and/or breaking away from the motor case or from other propellant to which it is usually bonded; cracks between case and propellant or between propellant and propellant would result from unrelieved tension or compression forces caused by restraint of the propellant charge by the motor case. Actual motor failure could occur after propellant ignition as a result of the increased propellant surface area, from the cracks or breaks, exposed for burning. The increased surface area burning would produce more gas than desired and cause an increase in pressure within the motor; as the pressure increased beyond the strength of the motor case, rupture of the case would occur.

Figure 2:
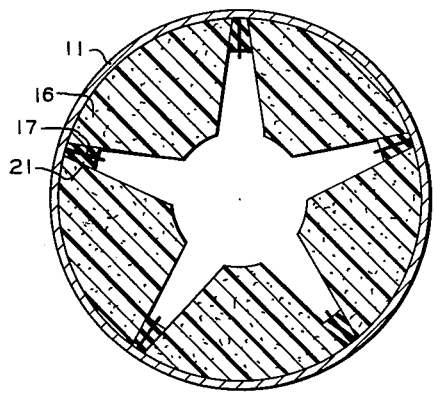
Figure 3:
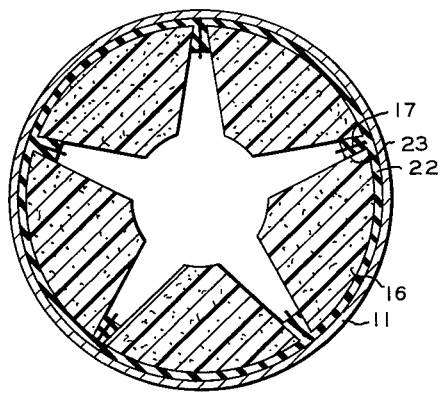
Figure 4:
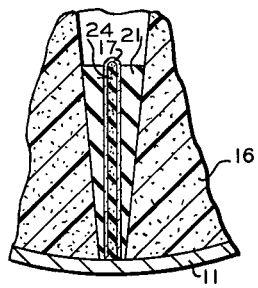
Figure 5:
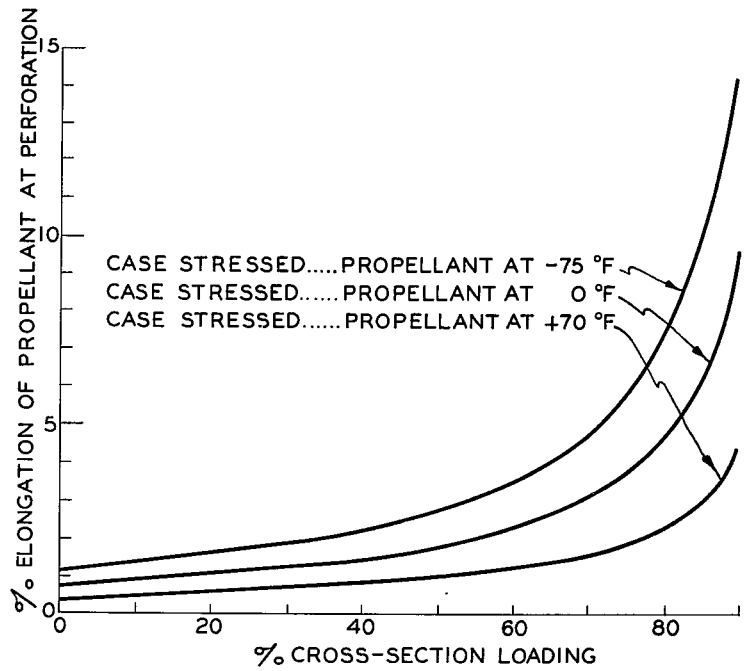
Figure 6:
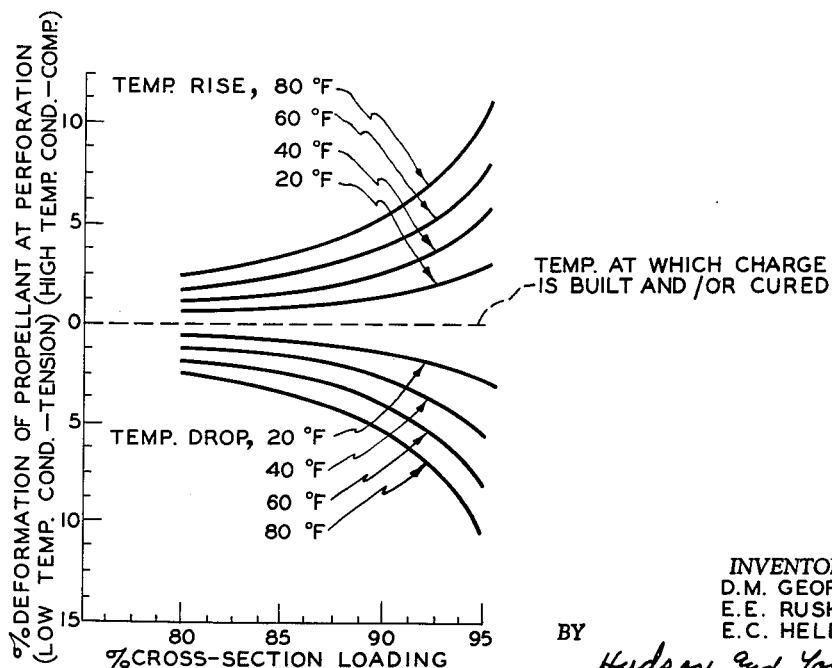

It is an object of this invention to provide expansion relieving joints for use in rocket motors containing a solid propellant charge. It is also an object of this invention to provide a means for relieving expansion between the rocket motor case and the solid propellant charge. A more specific object of the invention is the provision of expansion relieving means between the grains of propellant making up the solid propellant charge. Further objects and advantages will be apparent to one skilled in the art upon study of this disclosure including the appended drawing wherein:

FIGURE 1 represents a rocket motor partly in cross-section;
FIGURE 2 is in a section of FIGURE 1 along lines 2—2 illustrating an embodiment of the invention;
FIGURE 3 illustrates a modification of the invention as shown in FIGURE 2;
FIGURE 4 is a detailed view of the expansion hinge of FIGURES 2 and 3;
FIGURE 5 illustrates order-of-magnitude strains in case bonded charges; and
FIGURE 6 illustrates temperature variation strains in case bonded charges.

Broadly, the invention contemplates an expansion joint comprising a hinge formed by folding a sheet of non-combustible compressible material and bonding said folded material to adjacent grains of solid propellant or to the solid propellant and the rocket motor case. The folded material opens up upon abrupt expansion of the motor case resulting from ignition of the propellant charge to relieve the strains between the motor case and propellant grain and between the individual modules of the grains and at the same time prevents entry of the hot combustion gases to the opening thus preventing an increase in the burning surface and overheating of the rocket motor casing. The folded material also opens and closes to accommodate the differences in expansion of propellant and case caused by changes in temperature of the motor during storage.

Referring now to the drawing and particularly to FIGURE 1 a rocket motor 10 comprising a rocket motor case 11 having a forward end plate 12 an aft end plate 13 and exhaust nozzle 14 and an igniter 15 is shown partially in section so as to illustrate a portion of the propellant charge 16 and the folded ceramic fiber paper 18 bonded to the propellant charge 16 by restrictor 22 and bonded to the end plate 12 by restrictor 19.

FIGURE 2 shows the expansion joint hinge 17 positioned in the restrictor material 21 which is bonded to the hinge and to the propellant grain 16. The propellant grain is bonded directly to the case 11.

FIGURE 3 shows a modification of the invention wherein the propellant grain 16 is bonded to the restrictor material 22 which is bonded to the case so that the grain is bonded to the case through the medium of the restrictor material 22. The restrictor material also bonds the grains together at 23 and the folded hinge 17 is positioned in the restrictor which bonds the individual grains together.

FIGURE 4 shows the detail of the folded sheet of material 17 which forms the expansion joint and is bonded to the restrictor material 21 of FIGURE 2, 22 of FIGURE 3, and 22 and 19 of FIGURE 1. A compressible material, 24, such as cork or firm sponge rubber may be positioned between the folds of the hinge, as shown in FIGURE 4 if accommodation for greater amounts of expansion or contraction desired.

In the modification shown in FIGURE 2 the modules of propellant 16 are ordinarily positioned in the rocket motor case, the folded fiber paper hinges are positioned in the interstitial spaces between the modules; and a castable bonding material, which also serves as restrictor, is forced into the remaining cavity and the entire composition is cured within the rocket motor case.

In the embodiment shown in FIGURE 3, the bonding agent, which also acts as restrictor, is applied to the sides of the individual modules and the folded bondable mat is then bonded to the bonding agent during assembly of the rocket grain. Restrictor material (or bonding agent) is also applied to the exterior of the assembled grain and serves to bond the grain to the motor case.

For the purpose of showing the magnitude of strains that can be produced in a case bonded solid propellant charge, calculations have been made, assuming a tubular charge with a cylindrical centrally located perforation, to determine strains produced at the central perforation for various degrees of cross section loading and for various changes in engine temperature and chamber pressure. The results of these calculations are presented in FIGURES 5 and 6. The calculations take into account that when an engine is pressurized, the strain of the case wall increases the area of the case cross section, that the bonded charge follows the movement of the wall resulting in an increase in the area of the perforation and requiring a maximum elongation in the propellant in the hoop direction immediately adjacent to the perforation. The calculations also take into account that when the engine temperature changes, due to the differences in thermal expansion of the metal case and the propellant, propellant expansion being the greater, the diameter of the perforation is changed causing maximum stresses in the hoop direction adjacent to the perforation. The grain geometry chosen for these calculations is for a geometrically symmetrical simple charge; for other perforation shapes, such as a star, the calculations are similar but complicated by provisions for stress concentration, and generally speaking the strains in the propellant are even greater than for the grain shape chosen here.

FIGURE 5 shows a curve for a case pressurized producing a wall stress of 140,000 p.s.i. with propellant not thermally stressed at a temperature of 70° F. The curve indicated a required elongation of the propellant at the perforation of about 2 percent for an 80 percent cross section loading or 4½ percent for a 90 percent loading. Obviously, if the case wall were stressed to a higher value than 140,000 p.s.i., which is the current trend for ballistic missiles, a still greater elongation would be required. It is also to be noted that an 80 percent cross section loading corresponds to a perforation diameter which is 40 percent of the case diameter, and this loading is lower than the current trend for ballistic missiles. It is further noted that the curve is asymptotic to the 100 percent loading line, indicating infinite elongation required for a propellant charge with perforation of infinitesimal diameter.

FIGURE 6 shows the influence of engine temperature change on propellant strain at the perforation. This figure shows that for a drop in temperature of 80 degrees F. a strain of 5.3 percent is required of the propellant with a 90 percent cross section loading. A greater temperature change would require even greater elongation. The curves of this figure are also asymptotic to the 100 percent cross section loading line, indicating infinite elongation required for a propellant charge with perforation of infinitesimal diameter.

FIGURE 5 indicates also the strains produced in a propellant charge for combined pressure and temperature change. The upper curve indicates that a charge unstressed at 70 degrees F. and cooled to −75 degrees F., in a case pressurized to a wall stress of 140,000 p.s.i., with a cross section of 90 percent, would require an elongation of 14 percent at the cylindrical perforation.

Most cast propellants are cured at temperatures of 140 to 200 degrees F., resulting in an unstressed grain at the cure temperature. Military specifications generally call for operation between temperature limits of −75 degrees F. to 170 degrees F., which is a temperature change even greater than shown on these figures.

More calculations could be made to represent all possible conditions of loading, pressure, and temperature. However, it is believed that the example cited adequately indicates the magnitude of the problem which is circumvented by the object of this invention.

Suitable materials for the sheets of folded materials which make up the expansion joints include asbestos paper, glass cloth, and similar ceramic fiber materials which can be formed into flexible non-combustible sheets.

Materials which are suitable for the restrictor and bonding compositions applicable for this invention include thermosetting adhesives comprising mixtures of rubber and epoxy resins; mixtures of polyurethane and urethane prepolymer; mixtures of GRS rubber and carbon black; and the like. These adhesives can be cured under the same conditions that are used to cure the propellant grain.

Solid propellants generally are applicable for use in this invention. The invention is particularly applicable for use with solid propellants comprising a major amount of a solid inorganic salt; and a minor amount of a rubbery binder material containing reinforcing agents, plasticizers and curing agents. Solid propellant compositions comprising 50 to 90 parts by weight of solid inorganic oxidizing salt; a small amount of a burning rate catalyst; and from 10 to 50 parts by weight of a copolymer of a conjugated diene having 4 to 6 carbon atoms and a heterocyclic nitrogen base together with a reinforcing agent and a plasticizer, are described and claimed in application, Serial No. 574,041, filed March 26, 1956, by B. W. Williams et al.

The rubbery polymers employed as binders in the solid rocket fuel compositions of the referred-to copending application are copolymers of conjugated dienes with polymerizable heterocyclic nitrogen bases of the pyridine series. These copolymers can vary in consistency from very soft rubbers, i.e., materials which are soft at room temperature but will show retraction when relaxed, to those having a Mooney value (ML–4) up to 100. The rubbery copolymers most frequently preferred have money values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion, as the unreacted vinylpyridine monomer is difficult to remove by stripping.

The conjugated dienes employed are those containing from 4 to 6 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy,3-ethylbutadiene, 2-ethoxy-3-ethyl-1,3-hexadiene, 2-cyano-1,3-butadiene, are also applicable in the preparation of the polymeric binders of this invention.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

substituent wherein R' is either hydrogen or a methyl group. That is, the substituent is either a vinyl or an alpha-methylvinyl(isopropenyl) group. Of these, the compounds of the pyridine series are of the greatest interest commercially at present. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

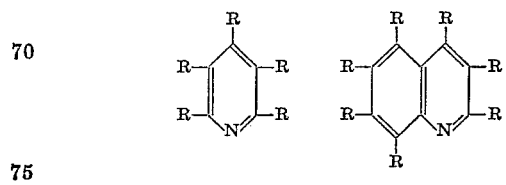

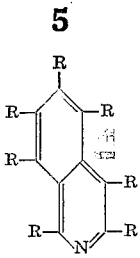

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are
2-vinylpyridine;
2-vinyl-5-ethylpyridine;
2-methyl-5-vinylpyridine;
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
2,4-dimethyl-5,6-dipentayl-3-vinylpyridine;
2-decyl-5-(alpha-methylvinyl)pyridines;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl)pyridine;
3-vinyl-5-phenylpyridine;
2-(para-methyl-phenyl)-3-vinyl-4-methylpyridine;
3-vinyl-5-(hydroxyphenyl)-pyridine;
2-vinylquinoline;
2-vinyl-4-ethylquinoline;
3-vinyl-6,7-di-n-propylquinoline;
2-methyl-4-nonyl-6-vinylquinoline;
4(alpha-methylvinyl)-8-dodecylquinoline;
3-vinylisoquinoline;
1,6-dimethyl-3-vinylisoquinoline;
2-vinyl-4-benzylquinoline;
3 - vinyl - 5 - chloroethylquinoline - 3 - vinyl - 5,6 - dichloroisoquinoline;
2-vinyl-6-ethoxy-7-methylquinoline;
3-vinyl-6-hydroxymethylisoquinoline; and the like.

Solid inorganic oxidizing salts which are applicable in the solid rocket fuel compositions of this invention include ammonium, alkali metal, and alkaline earth metal salts of nitric, perchloric, and chloric acids, and mixtures thereof. Ammonium nitrate and ammonium perchlorate are the preferred oxidants for use in the solid rocket fuels of this invention. Specific oxidants include sodium nitrate, potassium perchlorate, lithium chlorate, calcium nitrate, barium perchlorate, and strontium chlorate. Mixtures of oxidants are also applicable. In the preparation of the solid rocket fuel compositions, the oxidants are powdered to sizes preferably 5 to 300 microns average particle size. The amount of solid oxidant employed is usually a major amount of the total composition and is generally in the range between 50 and 95 percent by weight of the total mixture of oxidant and binder. If desired, however, less than 50 percent by weight of the oxidant can be used.

Combustion rate catalysts applicable in the invention include ammonium dichromate, metal ferrocyanides and metal ferricyanides. The complex metal cyanides are preferred. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is pigment similar to Prussian blue and is prepared by the oxidation of a paste of potassium ferrocyanide and ferrous sulfate. Other metal compounds such as nickel and copper ferrocyanides can also be employed. The amount of combustion catalyst will usually be 0.25 to 12 parts by weight per hundred parts of oxidant and binder. The catalyst can be omitted entirely if desired.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

In general, any rubber plasticizers can be employed in these binder compositions. Materials such as Pentaryl A (amylbiphenyl), Paraflux (saturated polymerized hydrocarbon), Circosol–2XH (petroleum hydrocarbon softener having a specific gravity of 0.940 and a Saybolt Universal viscosity at 100° F. of about 2000 seconds), dibutoxyethoxyethyl formal, and dioctyl phthalate are suitable plasticizers. Materials which provide rubber having good low temperature properties are preferred. It is also frequently preferred that the plasticizers be oxygen-containing materials. The amount of plasticizer used will be only that required to render the copolymer manageable during incorporation of the oxidizer and extruding the product. Ordinarily 15 to 30 parts by weight per hundred parts by weight of copolymer of the plasticizer will be used although more or less can be used and can be omitted if its presence is not required to incorporate the ingredients. Liquid polybutadiene and aromatic hydrocarbon oils resulting from the distillation of petroleum fractions are preferred plasticizers because they are particularly effective in rendering the components of the composition manageable and are entirely consumed as fuel. An aromatic residual oil having an API gravity at 60° F. of about 10 to about 13.5 has been found particularly effective.

The various ingredients in the rocket fuel composition can be mixed on a roll mill or an internal mixer such as a Banbury, Bramley-Beken, or a Baker-Perkins dispersion blade mixer can be employed. The binder forms the continuous phase in the finished fuel composition with the oxidant as the discontinuous phase.

EXAMPLE

Rocket motors charged with a modular, star-designed propellant charge substantially as shown in FIGURE 2, but without the expansion joints, were fired on a test stand and excessive heating of the motor case and occasional failure of the safety devices to relieve excessive pressures indicated bond failure between the propellant grains or between the propellant and the motor case. Subsequent firing of a rocket motor charged with a modular star design propellant grain substantially as shown in FIGURE 2 and having expansion joints at the junction of the modules as shown in FIGURES 2 and 4 showed no evidence of excessive heating of the motor case and there was no failure of devices for relieving excessive pressure. Asbestos paper, 0.027 inch thick, was folded and used as the expansion joint in the propellant charge.

The composition of the solid propellant used in the above firings is shown in the following Table I.

Table I

| Component: | Parts by wt. |
|---|---|
| Bd/MVP (90–10) | 10.31 |
| Furnace carbon black | 2.32 |
| Dibutoxyethoxyethyl formal | 2.06 |
| Flexamine [1] | 0.31 |
| $NH_4NO_3$ | 85.00 |
| Milori blue | 2.00 |
| MgO | 0.50 |
| $NH_4Cr_2O_7$ | 4.00 |

[1] A physical mixture containing 65% of a complex diarylamine ketone reaction product and 35% N,N′-diphenyl-p-phenylene diamine.

The first four ingredients in the table comprise the binder portion; the fifth component is the oxidizer; and the last three components comprise the catalyst system.

The method of preparing the solid propellant charge with the expansion joints comprised building the finished grain from modular segments, applying a bonding cement to the area of the finished modules representing the joint between the adjacent modules, bonding the modules to the case with bonding agent and restrictor, folding a piece of asbestos paper and forcing it into the bonding agent between the modules with the opened end of the paper directed toward the case wall, repeating this procedure for each junction of the modules until the case is filled, applying pressure in a radial direction from the axis of the perforation and curing the bonding cement in the motor case at about 90° F. for a period of 2 to 48 hours. The bonding and restricting agent was a mixture of synthetic rubber and epoxy resin.

A sheet of foam rubber can be inserted within the open V of the folded expansion joint to provide additional protection by the expansion joint to compression between the modules of the propellant and between the propellant and the motor case.

Reasonable variations and modifications are possible within the scope of the present disclosure without departing from the spirit and scope of the invention.

That which is claimed is:

1. A rocket motor comprising a motor case; an axially perforated solid propellant charge comprising a plurality of modular sections bonded to said motor case; and a plurality of expansible means, each of which comprises a folded sheet of ceramic fiber paper bonded to adjacent modular sections of solid propellant with the open end of the fold adjacent the motor case so that said expansible means opens at the open end of the fold upon expansion of the motor case so as to protect the motor case from the hot combustion gases.

2. A rocket motor comprising a motor case having a forward head, an aft head and an exhaust nozzle in said aft head; an axially perforated solid propellant charge comprising a plurality of modular sections bonded to said motor case, said solid propellant comprising a solid inorganic oxidizing salt, a burning rate catalyst and a rubber binder containing a reinforcing agent and compounding agents; and a plurality of expansible means, each of which comprises a folded sheet of ceramic fiber paper bonded to adjacent modular sections of solid propellant with the open end of the fold adjacent the motor case so that the fold of the fiber paper acts as a hinge upon expansion of the motor case to preserve insulation of the motor case.

3. A rocket motor comprising a motor case having a forward head, an aft head and an exhaust nozzle in said aft head; a solid propellant charge having a star-shaped axial perforation therethrough and comprising a plurality of modular sections secured in said motor case; a first plurality of expansible means, each of which comprises a folded sheet of ceramic fiber paper bonded to adjacent modular sections of solid propellant with the open end of the fold adjacent the motor case; and a second plurality of expansible means, each of which comprises a folded sheet of ceramic fiber paper bonded to the end of a modular section and to the adjacent motor case head so that the fold of each sheet of ceramic fiber paper acts as a hinge so as to maintain insulation of the motor case upon expansion of the motor case.

4. The motor of claim 3 wherein the solid propellant charge is bonded directly to the motor case.

5. The motor of claim 3 wherein the solid propellant charge is bonded to a restrictor material and the restrictor material is bonded to said motor case.

6. A method for relieving differential expansion and contraction of a perforated, sectional propellant grain made up from a plurality of propellant grain sections joined together and bonded to a rocket motor case which comprises applying thermosetting adhesive bonding agent to the edges of propellant grain sections to be joined; assembling the sections to form the sectional propellant grain; applying thermosetting adhesive bonding agent to the peripheral exterior of said grain; positioning said grain within a rocket motor case; inserting a folded sheet of ceramic fiber paper into the adhesive between adjoining edges of each grain section, with the open ends of the fold toward the rocket motor case; applying pressure in a radial direction from the axis of the perforation of the grain; and curing said bonding agent at a temperature sufficient to set said thermosetting adhesive bonding agent.

7. A rocket motor comprising a motor case having a forward head, an aft head and an exhaust nozzle in said aft head; a solid propellant charge having a star-shaped axial perforation therethrough and comprising a plurality of modular sections secured to said motor case; a first plurality of expansible means, each of which comprises a folded sheet of ceramic fiber paper bonded to adjacent modular sections of solid propellant with the open end of the fold adjacent the motor case; a sheet of foam rubber positioned in each folded sheet of ceramic fiber paper in said first plurality of expansible means; a second plurality of expansible means, each of which comprises a folded sheet of ceramic fiber paper bonded to the end of a modular section and to the adjacent motor case head; and a sheet of foam rubber positioned in each folded sheet of ceramic fiber paper in said second plurality of expansible means.

References Cited in the file of this patent

UNITED STATES PATENTS

| 2,816,418 | Loedding | Dec. 17, 1957 |
| 2,853,946 | Loedding | Sept. 30, 1958 |

FOREIGN PATENTS

| 148,724 | Sweden | Apr. 15, 1958 |